(12) United States Patent
Zhang (10) Patent No.: US 10,267,964 B2
(45) Date of Patent: Apr. 23, 2019

(54) COLOR FILTER SUBSTRATE, PRODUCING METHOD THEREOF AND DISPLAY APPARATUS

(71) Applicants: BOE Technology Group Co., Ltd., Beijing (CN); Ordos Yuansheng Optoelectronics Co., Ltd., Inner Mongolia (CN)

(72) Inventor: Xiaojin Zhang, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 204 days.

(21) Appl. No.: 15/322,688

(22) PCT Filed: Mar. 9, 2016

(86) PCT No.: PCT/CN2016/075968
§ 371 (c)(1),
(2) Date: Dec. 28, 2016

(87) PCT Pub. No.: WO2016/188183
PCT Pub. Date: Dec. 1, 2016

(65) Prior Publication Data
US 2017/0168204 A1    Jun. 15, 2017

(30) Foreign Application Priority Data
May 28, 2015    (CN) .......................... 2015 1 0284865

(51) Int. Cl.
*G02B 5/28*    (2006.01)
*G02F 1/1335*    (2006.01)

(52) U.S. Cl.
CPC .......... *G02B 5/28* (2013.01); *G02F 1/133514* (2013.01); *G02F 1/133516* (2013.01); *G02F 1/133617* (2013.01); *G02F 2202/32* (2013.01)

(58) Field of Classification Search
CPC ................. G02B 5/28; G02F 1/133516; G02F 1/133514; G02F 1/1335; G02F 2202/32; G02F 1/133617
See application file for complete search history.

(56) References Cited

U.S. PATENT DOCUMENTS

| 8,253,885 B2 | 8/2012 | Maeda et al. |
| 9,231,154 B2 | 1/2016 | Ikeda et al. |

(Continued)

FOREIGN PATENT DOCUMENTS

| CN | 1641413 A | 7/2005 |
| CN | 1680851 A | 10/2005 |

(Continued)

OTHER PUBLICATIONS

Machine English Translation of KR Application 10-2015-0132246; Mar. 28, 2017.*

(Continued)

*Primary Examiner* — Anh T Mai
*Assistant Examiner* — Glenn D Zimmerman
(74) *Attorney, Agent, or Firm* — Westman, Champlin & Koehler, P.A.

(57) ABSTRACT

The present disclosure provides a color filter substrate, a method for producing the same and a display apparatus. The color filter substrate includes a base substrate; a photonic crystal layer located on the base substrate; a plurality of light emitting medium layers corresponding to pixels of different colors located on the photonic crystal layer, wherein the light emitting medium layer is capable of emitting light of corresponding color under excitation of light from a backlight (Continued)

source; a transflective layer located on the light emitting medium layers; wherein the photonic crystal layer is used to reflect the light emitted from the light emitting medium layers to the transflective layer, so that the light is oscillated and interferes between the photonic crystal layer and the transflective layer and finally exits from the transflective layer.

18 Claims, 6 Drawing Sheets

(56) References Cited

U.S. PATENT DOCUMENTS

| | | | |
|---|---|---|---|
| 2006/0274232 | A1 | 12/2006 | Hsieh |
| 2007/0019439 | A1 | 1/2007 | Yu et al. |
| 2007/0247573 | A1* | 10/2007 | Ouderkirk ......... G02F 1/133536 349/114 |
| 2013/0128549 | A1* | 5/2013 | Weber .................... G02B 5/305 362/97.1 |
| 2013/0242228 | A1* | 9/2013 | Park .................. G02F 1/133617 349/61 |
| 2017/0082892 | A1* | 3/2017 | Chung .............. G02F 1/133514 |

FOREIGN PATENT DOCUMENTS

| | | |
|---|---|---|
| CN | 101494257 A | 7/2009 |
| CN | 103985732 A | 8/2014 |
| CN | 104865732 A | 8/2015 |
| JP | 2009-251247 A | 10/2009 |
| KR | 10-2010-0112785 A | 10/2010 |
| TW | 200705033 A | 2/2007 |

OTHER PUBLICATIONS

KR Application 10-2015-0132246; Mar. 28, 2017.*
First Office Action, including Search Report, for Chinese Patent Application No. 201510284865.X, dated May 2, 2017, 15 pages.
Second Office Action from Chinese Patent Application No. 2015102848965.X, dated Jul. 3, 2017, 15 pages.
Rejection Decision from Chinese Patent Application No. 201510284865.X, dated Oct. 11, 2017, 14 pages.
International Search Report and Written Opinion of International Application No. PCT/CN2016/075968, dated May 27, 2016, 11 pages.
English translation of Box No. V of the Written Opinion for the International Searching Authority for International Application No. PCT/CN2016/075968, 2 pages.

* cited by examiner

COLOR FILTER SUBSTRATE, PRODUCING METHOD THEREOF AND DISPLAY APPARATUS

CROSS-REFERENCE TO RELATED APPLICATION

This application is a Section 371 National Stage Application of International Application No. PCT/CN2016/075968, filed on Mar. 09, 2016, entitled "Color Filter Substrate, Producing Method Thereof And Display Apparatus", which has not yet published, and which claims priority to Chinese Application No. 201510284865.X, filed on May 28, 2015, incorporated herein by reference in their entirety.

BACKGROUND OF THE DISCLOSURE

Field of the Disclosure

The present disclosure relates to a technical filed of liquid crystal display, more particularly, to a color filter substrate, a producing method thereof and a display apparatus.

Description of the Related Art

With the development of liquid crystal display technique, LCD (Liquid Crystal Display) has been widely used in the display field.

The LCD typically includes an array substrate and a color filter substrate assembled together, as well as a liquid crystal layer charged between the array substrate and the color filter substrate. The LCD can adjust light from a backlight source, for displaying images. Normally, the backlight source is a LED backlight source emitting white light, which is formed by a blue light emitting chip in cooperation with a yellow phosphor powder.

However, color filters in the existing color filter substrate have relative bad color filtering capability. The colored light which is formed by filtering the white light with the color filter, has spectrum with relatively large FWHM (full width at half maximum). Further, the LCD has a relatively low degree of saturation, and the power consumption of the white light LED backlight source is relatively high.

SUMMARY

In order to at least partially alleviate the defects in the prior art, for example the low filtering capability of the color filter, the relatively larger FWHM of the spectrum of the colored light which is formed by filtering the white light with the color filter, the relatively high power consumption of the white light LED backlight source, embodiments of the present application provide a color filter substrate, a producing method thereof, and a display device.

In accordance with one aspect of the present application, it provides a color filter substrate, comprising:
 a base substrate;
 a photonic crystal layer located on the base substrate;
 a plurality of light emitting medium layers corresponding to pixels of different colors and located on the photonic crystal layer, wherein the light emitting medium layer is capable of emitting light with corresponding color under excitation of light from a backlight source;
 a transflective layer located on the light emitting medium layers;
 wherein the photonic crystal layer is used to reflect the light emitted from the light emitting medium layers to the half transparent and half reflection layer, so that the light is oscillated and interferes between the photonic crystal layer and the half transparent and half reflection layer and finally exits from the half transparent and half reflection layer.

In one example, the photonic crystal layer satisfies the following condition: having transmissivity greater than 60% to the light from the backlight source; and reflectivity greater than 80% to the light from the light emitting medium layers.

In one example, the photonic crystal layer is one dimensional photonic crystal layer, the half transparent and half reflection layer is a half transparent and half reflection metal layer, the light emitting medium layer is a photoluminescence layer.

In one example, the photonic crystal layer is formed by periodically stacking at least two kinds of transparent materials having different refraction indexes.

In one example, the photonic crystal layer comprises a plurality of photonic crystal sub-structures corresponding to each of the light emitting medium layers;
 wherein each photonic crystal sub-structure is formed by periodically stacking at least two kinds of transparent materials having different refraction indexes, and has at least five layers of transparent materials;
 any two of the photonic crystal sub-structures have different ranges of optical forbidden bands and have an overlapping region, and reflectivity of each photonic crystal sub-structure to light is positively correlated to a number of the layers of transparent materials.

In one example, the transparent materials for the respective photonic crystal sub-structures are of identical kinds, and each photonic crystal sub-structure comprises at most ten layers of the transparent materials;
 the half transparent and half reflection layer is an Ag or Al layer, a thickness of which is in a range of 10-15nm.

In one example, a thickness D of the light emitting medium layer satisfies the following equation:

$$D = \frac{\phi}{2n\pi};$$

wherein $\phi$ is a cumulative phase change of the light emitted from the light emitting medium layer when it is reflected by respective reflection interfaces, n is a refraction index corresponding to a main peak wavelength of the light emitted from the light emitting medium layer, and the reflection interfaces comprise an interface between the photonic crystal layer and the light emitting medium layer, and an interface between the half transparent and half reflection layer and the light emitting medium layer.

In one example, the color filter substrate further comprising a capping layer located on the half transparent and half reflection layer.

In one example, the plurality of light emitting medium layers comprises red light emitting medium layers, green light emitting medium layers and blue light emitting medium layers corresponding to pixels of different colors, wherein each of the light emitting medium layers is composed of fluorescent layers, phosphorescent layers or quantum dot layers.

In accordance with another aspect of the present application, it provides a display apparatus, comprising an array substrate and a color filter substrate assembled together, wherein the color filter substrate is a color filter substrate as described above.

In one example, the display apparatus further comprises a backlight source located at a backlight side of the array substrate;

the light emitted from the backlight source is violet light having a wavelength less than 430 nm, and the photonic crystal layer is capable of reflecting light having a wavelength greater than 430 nm.

In accordance with a further aspect of the present application, it provides a method for producing the color filter substrate, comprising:

forming the photonic crystal layer on the base substrate;

forming the plurality of light emitting medium layers corresponding to the pixels of different colors onto the photonic crystal layer, so that each of the light emitting medium layers is capable emitting light with corresponding color under excitation of light from a backlight source;

forming the half transparent and half reflection layer onto the light emitting medium layers;

reflecting by the photonic crystal layer the light emitted from the light emitting medium layers to the transflective layer, so that the light is oscillated and interferes between the photonic crystal layer and the transflective layer;

exiting the reflected light from the transflective layer.

In one example, the step of forming the half transparent and half reflection layer onto the light emitting medium layers comprises forming an Ag or Al layer with a thickness of 10-15 nm onto the light emitting medium layers by vacuum thermal evaporation, so that reflectivity of the Ag or Al layer is in a range of 60-70%.

In one example, the step of forming the plurality of light emitting medium layers corresponding to pixels of different colors onto the photonic crystal layer comprises:

forming a plurality of fluorescent layers, phosphorescent layers or quantum dot layers corresponding to the pixels of different colors onto the photonic crystal layer.

In one example, the method further comprising a step of forming a capping layer onto the half transparent and half reflection layer.

At least one of technical solutions of the present application can bring about at least part of the following technical effect.

The photonic crystal layer, the light emitting medium layers and the transflective layer are formed on the base substrate in sequence, the light emitting medium layer is capable of emitting the light of the corresponding color under the excitation of the light rays from the backlight source, the photonic crystal layer is used to reflect the light emitted from the light emitting medium layer to the transflective layer by several times, so that the light is oscillated and interferes between the photonic crystal layer and transflective layer, and finally outgoes from the transflective layer. By means of the modulation of the micro-cavities, the present application can solve at least part of the problems in the art, such as the relatively larger FWHM of the spectrum of the colored light which is formed by filtering the white light with the color filter in the art, relatively low saturation of LCD, and the relatively high power consumption of the white light LED backlight source, and partially achieve the technical effect of reducing the FWHM of the spectrum of the colored light and improving the saturation and energy conversation of LCD.

BRIEF DESCRIPTION OF THE DRAWINGS

In order to make technical solutions of embodiments of the present disclosure become clear, the drawings used in the embodiments are briefly discussed. It is obvious that the drawings in the followings are only referred to some embodiments of the present disclosure, and thus the person skilled in the art can obtain other drawings based on the above drawings without any creative efforts.

DETAILED DESCRIPTION OF PREFERRED EMBODIMENTS OF THE DISCLOSURE

Below, objectives, technical solutions and advantages of embodiments of the present application would become more clear, after the technical solutions of the present embodiments are clearly and completely described with reference to figures related to the embodiments. It is obvious that the described embodiments are only a part of the embodiments of the present application, rather than all of the embodiments. On the basis of the embodiments of the present application, other embodiments which are obtained by the person skilled in the art without any creative efforts, will also fall within the scope of the present application.

Figure 1:
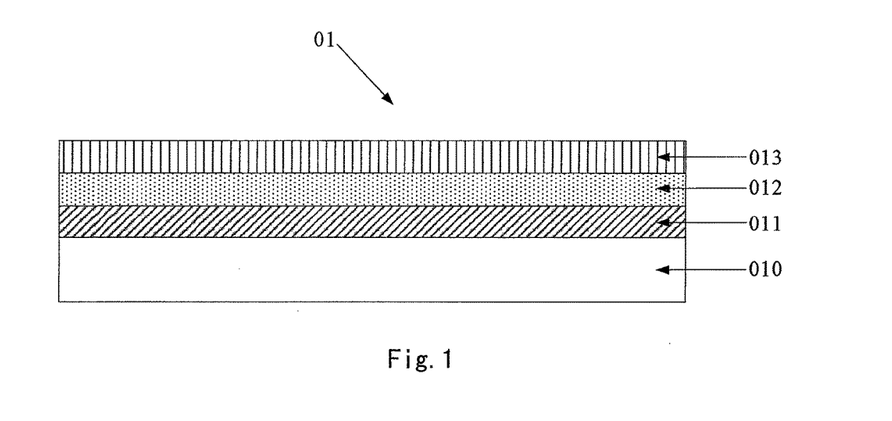
FIG. 1 is a schematic view for showing a structure of a color filter substrate in accordance with an embodiment of the present application.

With reference to FIG. 1, an embodiment of the present application provides a color filter substrate 01, including a base substrate 010. The base substrate 010 can be transparent, and specifically can be for example made from non-metal materials having a certain hardness, and being transparent for light, such as glasses, quartz, transparent resin.

The color filter substrate further includes a phonic crystal layer 011 located on the base substrate 010; a plurality of light emitting medium layers 012 located on the phonic crystal layer 011 and corresponding to pixels of different colors, wherein the light emitting medium layers 012 can emit light with corresponding color under the excitation of light rays from the backlight source; and a transflective layer 013 located on the light emitting medium layer 012. The phonic crystal layer 011 is used to reflect the light emitted from the light emitting medium layer 012 (at an one time or more times) to the transflective layer 013, so that the light is oscillated and interferes between the phonic crystal layer 011 and the transflective layer 013, thereby exiting from the transflective layer 013 finally.

Specifically, micro-cavities can be formed between the phonic crystal layer 011 and the transflective layer 013, and the light emitting medium layer 012 is equivalent to medium charged into the micro-cavities.

Concerning the above, with the color filter substrate in accordance with embodiments of the present application, the photonic crystal layer, the light emitting medium layer and the transflective layer are formed on the base substrate in sequence, the light emitting medium layer is capable of emitting the light with the corresponding color under the excitation of the light rays from the backlight source, the photonic crystal layer is used to reflect the light emitted from the light emitting medium layer to the transflective layer by several times, so that the light is oscillated and interferes between the photonic crystal layer and transflective layer, and finally outgoes from the transflective layer.

By means of the tuning or modulation of the micro-cavities, the present application can solve part of the problems in the art, such as the relatively larger FWHM of the spectrum of the colored light which is formed by filtering the white light with the color filter, relatively low saturation of LCD, and the relatively high power consumption of the white light LED backlight source, and partially achieve the technical effect of reducing the FWHM of the spectrum of the colored light and improving the saturation and energy conversation of LCD.

Figure 2:
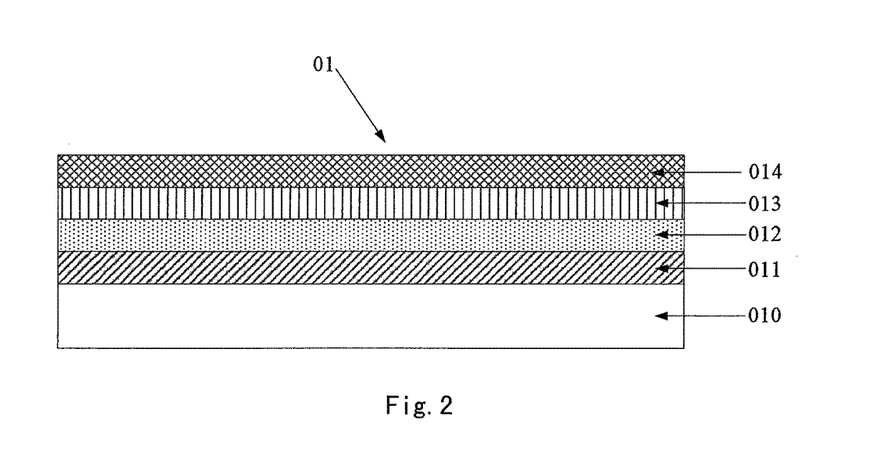
FIG. 2 is a schematic view for showing a structure of a color filter substrate in accordance with another embodiment of the present application.

With reference to FIG. 2, it shows a schematic view for showing a structure of another color filter substrate 01 in accordance with an embodiment of the present application. The color filter substrate 01 includes a base substrate 010. The base substrate 010 can be transparent, and specifically can be for example non-metal materials having a certain hardness, and being transparent for light, such as glasses, quartz, transparent resin.

The color filter substrate 01 further includes a photonic crystal layer 011 located on the base substrate 010; a plurality of light emitting medium layers 012 located on the photonic crystal layer 011 and corresponding to the pixel of different colors; and a transflective layer 013 located on the light emitting medium layers 012. The light emitting medium layer 012 can emit the light with corresponding color under the excitation of the light rays from the backlight source. The light of corresponding color can includes any of lights with various desired color, for example, red, green, blue. The photonic crystal layer 011 is used to reflect the light emitted from the light emitting medium layer 012 to the transflective layer 013 by many times, so that the light is oscillated and interferes between the photonic crystal layer 011 and the transflective layer 013, and exits from the transflective layer 013.

In one example, micro-cavities can be formed between the photonic crystal layer 011 and the transflective layer 013, and the light emitting medium layer 012 is equivalent to the medium charged in the micro-cavities.

Further, in order to prevent oxidation of metal in the transflective layer 013 and to improve light emitting property of the color filer substrate 01, a capping layer (CPL) 014 is formed on the transflective layer 013. The capping layer 014 is typically made of the materials having high reflectivity and low coefficient of light extinction, for example NPB. Taking into consideration of the color difference from various angles, the capping layer 014 has a thickness less than 100 nm, and in one example, the thickness of the capping layer 014 is 80 nm. The step of forming the capping layer 014 can include depositing a NPB layer with a thickness of 80 nm onto the transflective layer 013 by vacuum thermal evaporation, so as to form the capping layer 014.

Specifically, the photonic crystal layer 011 has a certain optical forbidden band , so that the light which has the wavelength within a range of the optical forbidden band cannot pass through the photonic crystal layer 011, thereby presenting a high reflectivity, whereas the light which has the wavelength out of the range of the optical forbidden band can pass through the photonic crystal layer 011, thereby presenting a high transmissivity. In the present embodiment, the photonic crystal layer 011 shall satisfy the following conditions: the transmissivity of the light from the backlight source is greater than 60%; and the reflectivity of the light from the light emitting medium layer is greater than 80%. Therefore, the photonic crystal layer 011 has the high transmissivity to the light from the backlight source, and the light reflectivity to the light emitted from the light emitting medium layer 012, so that the photonic crystal layer 011 can reflect the light emitted from the light emitting medium layer 012 to the transflective layer 013 by one or more times.

In one example, the photonic crystal layer 011 can be one dimensional photonic crystal layer, and can be formed by periodically stacking at least two different transparent material layers with different refraction indexes onto the base substrate 010.

Figure 3:
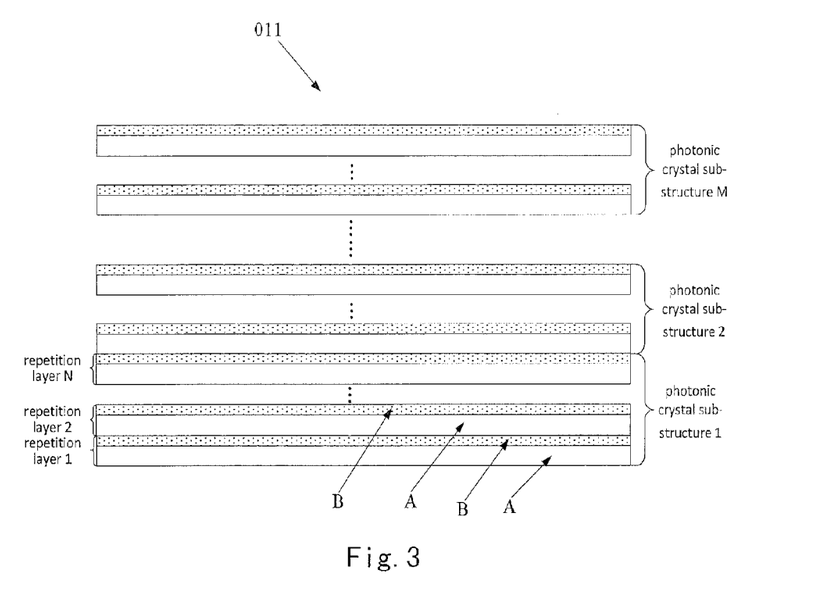
FIG. 3 is a schematic view for showing a structure of a photonic crystal layer as shown in FIG. 2.

As shown in FIG. 3, it shows a schematic view for showing a structure of the photonic crystal layer 011 as shown in FIG. 2. The photonic crystal layer 011 includes a plurality of photonic crystal sub-structures 1, 2 . . . M corresponding to each of the light emitting medium layers 012, wherein M≥2, M being an integer. Each of the photonic crystal sub-structures 1, 2 . . . M includes a plurality of repeating layers formed by periodically stacking two transparent material layers with different refraction indexes, and the transparent material layers (the repeating layers) have a repetition period of N, N≥5, and being a positive integer. Illustratively, taking the photonic crystal sub-structure 1 as an example, as shown in FIG. 3, it includes N repetition layers, each of which includes a layer A made of a material a and another layer B made of another material b. The transparent materials for making the respective photonic crystal sub-structures are identical with each other, and any two of the photonic crystal sub-structures have different ranges of the optical forbidden bands, which are overlapped with each other. There is a positive correlation between the reflectivity of each photonic crystal sub-structure to the light emitted from the light emitting medium layer 12 and the number N of the repetition layers. The thicknesses of the layers A and B and the number of the repetition layers within each photonic crystal sub-structures can be controlled, i.e., they can be controlled to make different photonic crystal sub-structures 1 have different ranges of the forbidden bands.

In one example, the photonic crystal layer 011 is formed on the base substrate 010 by methods such as thermal evaporation, electron beam, molecular beam epitaxy (MBE), magnetron sputtering, PECVD (Plasma Enhanced Chemical Vapor Deposition) or the like. Specifically, the photonic crystal layer 011 is formed by alternatively depositing a certain thickness of two transparent materials with different refraction indexes onto the base substrate 010 by the methods such as thermal evaporation, electron beam, MBE, magnetron sputtering, PECVD or the like. Illustratively, with reference to FIG. 3, taking the photonic crystal sub-structure 1 as one example, a layer of material a with a certain thickness is deposited onto the base substrate 010 by the methods such as thermal evaporation, electron beam, MBE, magnetron sputtering, PECVD or the like, to form the layer A, and another layer of material b with a certain thickness is deposited onto the layer A again by the methods such as thermal evaporation, electron beam, MBE, magnetron sputtering, PECVD or the like, to form the layer B. Thus, a repetition layer 1 is formed. Then a layer of material a with a certain thickness is deposited onto the layer B of the repetition layer 1 by the methods such as thermal evaporation, electron beam, MBE, magnetron sputtering, PECVD or the like, to form the layer A, and another layer of material b with a certain thickness is deposited onto the layer A again by the methods such as thermal evaporation, electron beam, MBE, magnetron sputtering, PECVD or the like, to form the layer B. Thus, the repetition layer 2 is formed, and the rest may be deduced by analogy. It is finished until the repetition layer N is formed. At this time, the photonic crystal sub-structure 1 is obtained. The photonic crystal sub-structures 2, 3, ... M are made by the method similar to that of the photonic crystal sub-structure 1, thereby forming the photonic crystal layer 011.

It should be noted that in one example of the present application, the material a can be $SiO_2$, and the material b can be ZnO. In an alternative example, the material a can be $Ta_2O_5$ with the refraction index $n_a=2.096$, and the material b can be $MgF_2$ with the refraction index $n_b=1.38$.

It also should be noted that because the largest refraction index of the available transparent material is not more than 2.6, and not less than 1.3, the optical forbidden band of the photonic crystal layer 011 cannot sufficiently reflect the light emitted from the light emitting medium layer 012. In the present embodiment, the photonic crystal layer 011 is composed of M photonic crystal sub-structures, and the optical forbidden bands of any two photonic crystal sub-structures have different ranges and are overlapped with each other (there is an overlapping region), so that the ranges of the optical forbidden bands for the photonic crystal layer 011 can be adjusted in the present embodiment, so that the photonic crystal layer 011 has sufficient ranges of forbidden bands to entirely reflect the light emitted from the light emitting medium layer 012.

Figure 4:
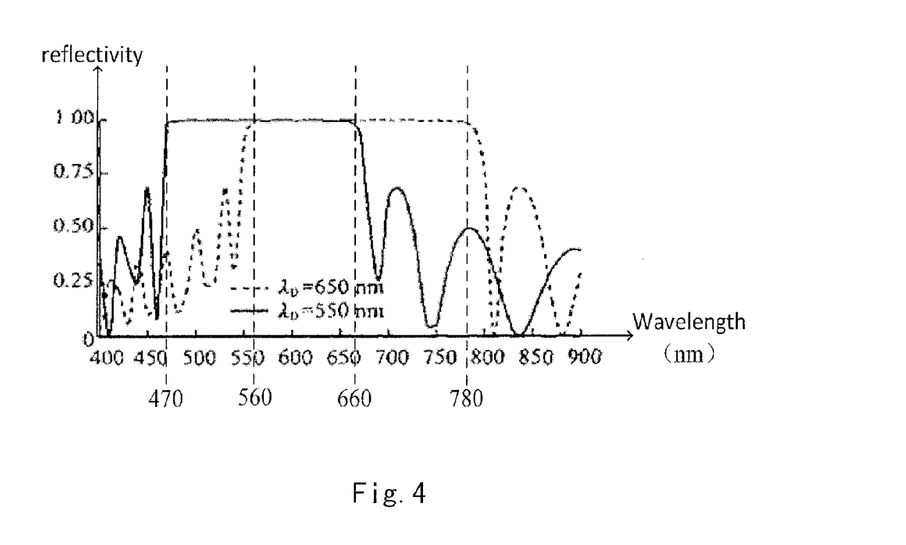
FIG. 4 is graph showing superposition of optical forbidden bands of two phonic crystal sub-structures with different central wavelengths as shown in FIG. 3.

Illustratively, FIG. 4 is a graph for showing superposition of optical forbidden bands of two photonic crystal sub-structures with central wavelengths of 650 nm and 550 nm. In FIG. 4, $\lambda_0$ indicates a central wavelength of the optical forbidden band of the photonic crystal sub-structure. It can be seen that the photonic crystal sub-structure with the central wavelength of 650 nm has the optical forbidden band in a range of 560 nm~780 nm, and the photonic crystal sub-structure with the central wavelength of 550 nm has the optical forbidden band in a range of 470 nm~660 nm, and thus the photonic crystal layer which is composed of the photonic crystal sub-structure with the central wavelength of 650 nm and the photonic crystal sub-structure with the central wavelength of 550nm, has the optical forbidden band in a range of 470 nm~780 nm. As compared with the photonic crystal layer composed of only one photonic crystal sub-structure, this kind of the photonic crystal layer composed of two photonic crystal sub-structures with different central wavelengths has a larger optical forbidden band. Herein, the central wavelength is meant to a central wavelength of the optical forbidden band. Provided that the range of the optical forbidden band of some photonic crystal sub-structure is $\lambda_{min} \sim \lambda_{max}$, the central wavelength of the optical forbidden band of the photonic crystal sub-structure is $$\lambda_0 = \frac{2\lambda_{min}\lambda_{max}}{\lambda_{min} + \lambda_{max}},$$

and the width of the optical forbidden band thereof is $$d = 2\left(\frac{\lambda_0}{\lambda_{min}} - 1\right).$$

In the present embodiment, the thicknesses of the layers A and B and the number of the repetition layer within each photonic crystal sub-structure can be controlled so as to make the different photonic crystal sub-structures have different ranges of forbidden bands. Assuming that the layer A has the thickness of $d_A$ and the layer B has thickness of $d_B$, $d_A$ and $d_B$ shall meet the equation $$k(w) = \frac{2N\lambda_0}{d_A + d_B},$$

where $$k(w) = \frac{2\pi}{\lambda_0},$$

N=1, 2, 3 ... N indicates the repetition number of the layers A and B within the photonic crystal sub-structure, and $\lambda_0$ indicates the central wavelength of the optical forbidden band of the photonic crystal sub-structure. Illustratively, in an embodiment of the present application, when the material a is $Ta_2O_5$, and the material b is $MgF_2$, as for each photonic crystal sub-structure, $d_A+d_B=100\sim200$ nm, $d_A:d_B=0.25\sim4$. Because the thickness of the photonic crystal layer 011 is ¼ of the central wavelength of the optical forbidden band of the photonic crystal layer 011, the photonic crystal layer 011 has the highest reflectivity. Therefore, in order to ensure the reflectivity of the photonic crystal layer 011, the thickness of the photonic crystal layer 011 shall be ¼ of the central wavelength of the optical forbidden band of the photonic crystal layer 011.

Figure 5:
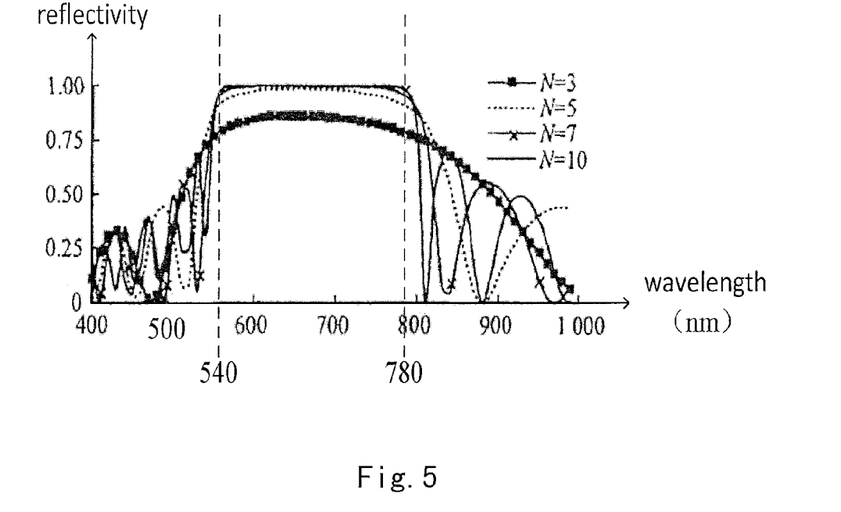
FIG. 5 is a relationship graph of number of repeated layers in the photonic crystal sub-structure v.s. reflectivity of the photonic crystal sub-structure for light emitted from the light emitting medium layer as shown in FIG. 3.

In an embodiment of the present application, there is a positive correlation between the reflectivity of the photonic crystal sub-structure to the light emitted from the light emitting medium layer 012 and the number N of the repetition layer within the photonic crystal sub-structure. In theory, the larger the value of N is, the higher the reflectivity of the photic crystal sub-structure to the light emitted from the light emitting medium layer 012. However, when the photonic crystal sub-structure reflects the light emitted from the light emitting medium layer 012, it will absorb a part of the light. Thus, when the value of the N is too large, it will reduce the light emitting efficiency of the light emitted from the transflective layer 013. FIG. 5 shows a relationship the number N of the repetition layer in the photonic crystal sub-structure and the reflectivity of the photonic crystal sub-structure to the colored light emitted from the light emitting medium layer 012. As shown in FIG. 5, when N=5, the reflectivity of the photonic crystal sub-structure to the colored light emitted from the light emitting medium layer 012 is close to 1, and thus in the embodiment of the present application, N≥5. In one example, taking into account of the light emitting efficiency of the emitted light form the transflective layer 013, for example, 10≥N≥6.

In one example, the light emitting medium layer 012 is made from photoluminescence materials. The photoluminescence materials can be fluorescent materials or phosphorescent materials. Under the excitation of the light, the light emitted from the light emitting medium layer 012 can be any one of red, green and blue lights. The blue light can be emitted from the phosphorescent materials, which can include 80% CBP and 20% FIrpic. Alternatively, the blue light can be emitted from the fluorescent materials, which include 95% DSA and 5% DPVBi. The green light can be emitted from the phosphorescent materials, which can include 95% CBP and 5% Ir(ppy)$_3$. Alternatively, the green light can be emitted from the fluorescent materials, which include 99% Alq$_3$ and 1% C-545T being one kind of Bean flavor compounds. The red light can be emitted from the phosphorescent materials, which can include 97% CBP and 3% Q$_3$Ir. Alternatively, the red light can be emitted from the fluorescent materials, which include 98% Alq$_3$ and 2% DCJTB. In other words, the plurality of the light emitting medium layers include a red light emitting medium layer, a green light emitting medium layer and a blue light emitting medium layer corresponding to pixels of different colors respectively, each of which is composed of a fluorescent layer, a phosphorescent layer or a quantum dot layer.

It should be noted that in the embodiment of the present application, in order to excite the light emitting medium layer 012 with high efficiency, the photoluminescence material of the light emitting medium layer 012 has an absorption spectrum, which has a relatively large overlapping region with the spectrum of the light emitted from the light emitting medium layer 012 under excitation. In order to guarantee an intensity of light emitted from the transflective layer 013, when the light is oscillated and interferes between the photonic crystal layer 011 and the transflective layer 013, the thickness D of the light emitting medium layer 012 shall satisfy the following equation:

$$D = \frac{\phi}{2n\pi},$$

if the zeroth period interference mode is used, wherein $\phi$ is a cumulative phase change of the light emitted from the light emitting medium layer when it is reflected by respective reflection interfaces, that is, a sum of the phase changes of the light on the respective reflection interfaces, and n is a refraction index corresponding to a main peak wavelength of the light emitted from the light emitting medium layer 012. In one example, if the light emitting medium layer 012 emits red light, then n is a refraction index corresponding to the main peak wavelength of the red light. The reflection interfaces include an interface between the photonic crystal layer 011 and the light emitting medium layer 012, and an interface between the transflective layer 013 and the light emitting medium layer 012. If the refraction index and the coefficient of light extinction of the light emitting medium layer 012 and the transflective layer 013 are respectively (n, k) and (n$_1$, k$_1$), then $$\phi = \tan^{-1}\left(\frac{2nk}{n^2 - n_1^2 - k^2}\right).$$

It should be noted that the step for making the light emitting medium layer 012 can includes forming the light emitting medium layer 012 by depositing a layer of fluorescent materials or phosphorescent materials with a thickness of D onto the photonic crystal layer 011 by the methods such as thermal evaporation, electron beam, MBE, magnetron sputtering, PECVD or the like.

In one example, the transflective layer 013 is a half transparent and half reflection metal layer, which can be made from Ag or Al, so that the reflectivity of the transflective layer 013 is kept between 50%-70%. In the embodiment of the present application, the transflective layer 013 has a thickness in a range of 10~15 nm. For example, the step for making the transflective layer 013 can include depositing a layer of Ag with a thickness of 10~15 nm onto the light emitting medium layer 012 by a vacuum evaporation, so as to form the transflective layer 013.

Below, the method for producing the color filter substrate in accordance with the embodiment of the present application is discussed, and thus the same or similar parts are not repeatedly described herein.

Figure 6:
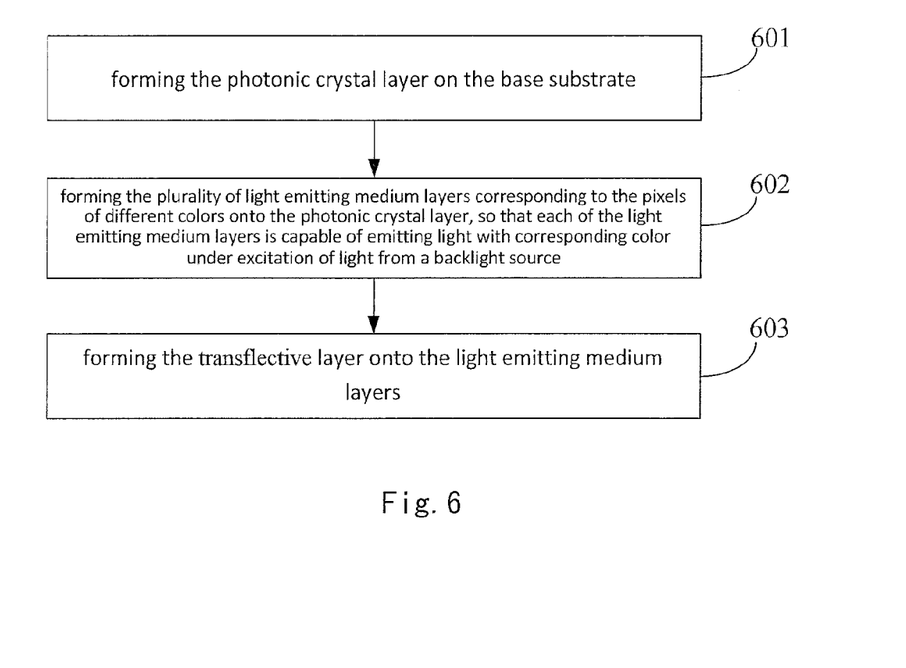
FIG. 6 is a flowchart of a producing method for a color filter substrate in accordance with an embodiment of the present application.

FIG. 6 is a flowchart of a method for producing the color filter substrate in accordance with an embodiment of the present application. The color filter substrate includes a base substrate, which is transparent. The base substrate is specifically selected to be the substrate which is made by the non-metal transparent material with a certain hardness for example the glass, quartz, or transparent resin. With reference to FIG. 6, the method specifically includes:

Step 601, forming a photonic crystal layer on the base substrate;

Step 602, forming a plurality of light emitting medium layers corresponding to pixels of different colors onto the photonic crystal layer, wherein each light emitting medium layer can emit the light with the corresponding color under the excitation of the light from the backlight source;

Step 603, forming a transflective layer onto the light emitting medium layers.

The photonic crystal layer is used to reflect the light emitted from the light emitting medium layer to the transflective layer, so that the light is oscillated and interferes between the photonic crystal layer and the transflective layer, and finally exits from the transflective layer.

Figure 7:
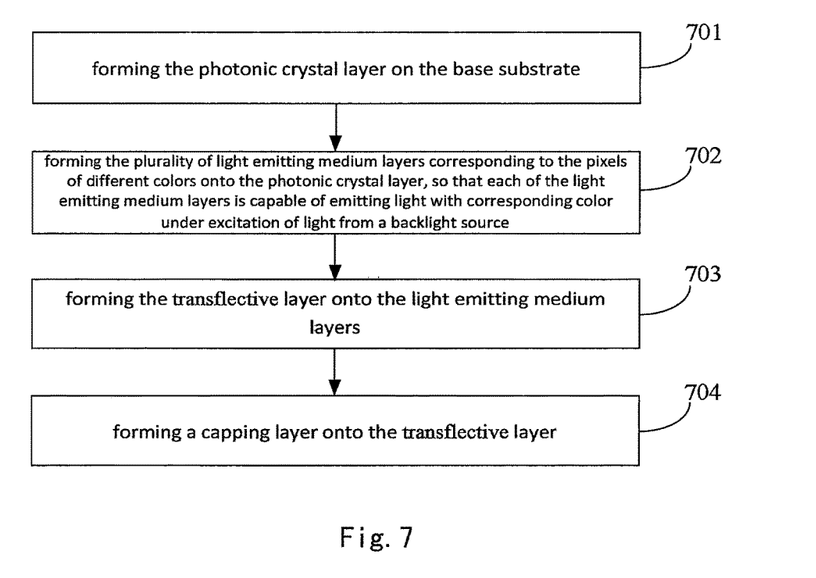
FIG. 7 is a flowchart of a producing method for a color filter substrate in accordance with another embodiment of the present application.

FIG. 7 is a flowchart of another method for producing the color filter substrate in accordance with another embodiment of the present application. The color filter substrate includes a base substrate, which is transparent. The base substrate is specifically selected to be the substrate which is made by the non-metal transparent material with a certain hardness for example the glass, quartz, or transparent resin. With reference to FIG. 7, the method specifically includes:

Step 701, forming a photonic crystal layer on the base substrate.

Figure 8:
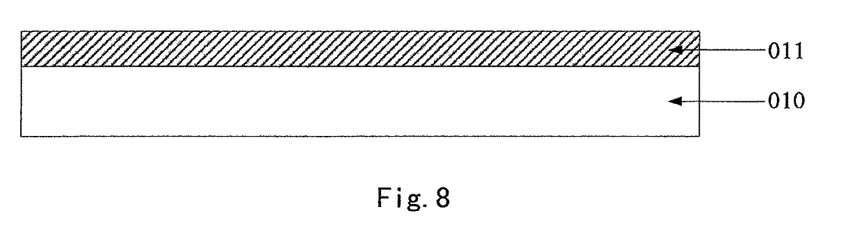
FIG. 8 is a schematic view for showing a structure after forming a photonic crystal layer onto a base substrate in accordance with one embodiment of the present application.

FIG. 8 is a schematic view for showing a structure after forming the photonic crystal layer 011 onto the base substrate 010. In an embodiment of the present application, the step of forming the photonic crystal layer 011 onto the base substrate 010 includes forming M photonic crystal sub-structures onto the base substrate 010 by periodically stacking two transparent materials with different refraction indexes. Each photonic crystal sub-structure is formed by periodically stacking two transparent material layers with different refraction indexes and includes a plurality of repetition layers having a repetition period of N, N≥5, and being a positive integer. In other words, each photonic crystal sub-structure includes N repetition layers, and all the photonic crystal sub-structures can be made by the transparent materials which are identical with each other. Any two of the photonic crystal sub-structures have different optical forbidden bands, which are overlapped with each other (i.e., having the overlapping region). There is a positive correlation between the reflectivity of each photonic crystal sub-structure to the light emitted from the light emitting medium layer 12 and the number N of the repetition layers. The photonic crystal layer 010 can be one dimensional photonic crystal layer, which has a transmissivity to the light from the backlight source greater than 60%.

In an embodiment of the present application, N≥5 and being an integer. In one example, 10≥N≥6. With reference to FIG. 3 which is a schematic view for showing a structure of the photonic crystal layer 011, the step for forming the photonic crystal layer 011 on the base substrate 010 specifically can include forming a photonic crystal layer 011 by alternately depositing two kinds of transparent materials having different refraction indexes in a certain thickness onto the base substrate 010 by means of the methods such as thermal evaporation, electron beam, MBE, magnetron sputtering, PECVD or the like. Illustratively, with reference to FIG. 3, taking the photonic crystal sub-structure 011 as one example, a layer of material a with a certain thickness is deposited onto the base substrate 010 by the methods such as thermal evaporation, electron beam, MBE, magnetron sputtering, PECVD or the like, to form the layer A, and another layer of material b with a certain thickness is deposited onto the layer A again by the methods such as thermal evaporation, electron beam, MBE, magnetron sputtering, PECVD or the like, to form the layer B. At this time, the repetition layer 1 is made. After that, a layer of material a with a certain thickness is deposited onto the layer B of the repetition layer 1 by the methods such as thermal evaporation, electron beam, MBE, magnetron sputtering, PECVD or the like, to form the layer A, and another layer of material b with a certain thickness is deposited onto such layer A again by the methods such as thermal evaporation, electron beam, MBE, magnetron sputtering, PECVD or the like, to form the layer B. At this time, the repetition layer 2 is made. As such, these procedures are repeated until the repetition layer N is made. After the repetition layer N is obtained, the photonic crystal sub-structure 1 is formed. The photonic crystal sub-structures 2, 3, . . . M are made by the method similar to that of the photonic crystal sub-structure 1, thereby forming the photonic crystal layer 011. In one example, the material a can be $Ta_2O_5$, which has the refraction index $n_a=2.096$, and the material b can be $MgF_2$, which has the refraction index $n_b=1.38$.

Step 702, forming a plurality of light emitting medium layers corresponding to pixels of different colors, onto the photonic crystal layer, wherein the light emitting medium layers can emit the light with corresponding color under excitation of the light from the backlight source.

The light with corresponding color can be selected as required. In one example, the light with corresponding color is one of the red, green or blue light, and the photonic crystal layer 011 has the reflectivity greater 80% to the light emitted from the light emitting medium layer 012.

Figure 9:
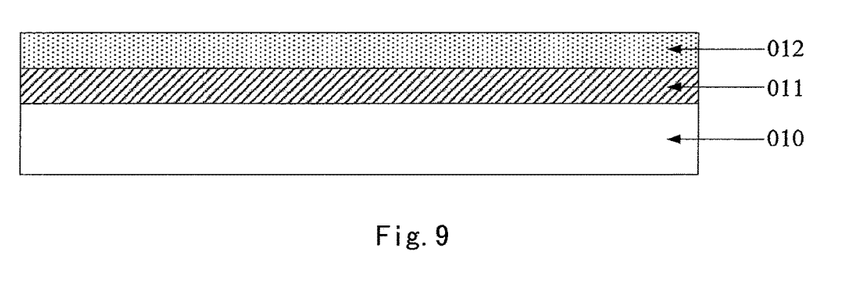
FIG. 9 is a schematic view for showing a structure after forming a light emitting medium layer onto the photonic crystal layer as shown in FIG. 8.

FIG. 9 is a schematic view for showing a structure after forming the light emitting medium layer 012 onto the photonic crystal layer 011. The light emitting medium layer 012 can be made by the photoluminescence materials, which can be fluorescent materials or phosphorescent materials. Under the excitation of the light, the light emitted from the light emitting medium layer 012 can be any one of red, green and blue lights. The blue light can be emitted from the phosphorescent materials, which can include 80% CBP and 20% FIrpic. Alternatively, the blue light can be emitted from the fluorescent materials, which include 95% DSA and 5% DPVBi. The green light can be emitted from the phosphorescent materials, which can include 95% CBP and 5% $Ir(ppy)_3$. Alternatively, the green light can be emitted from the fluorescent materials, which include 99% $Alq_3$ and 1% C-545T being one kind of Bean flavor compounds. The red light can be emitted from the phosphorescent materials, which can include 97% CBP and 3% $Q_3Ir$. Alternatively, the blue light can be emitted from the fluorescent materials, which include 98% $Alq_3$ and 2% DCJTB. In an embodiment of the present application, the step of forming the plurality of light emitting medium layers corresponding to the pixels of different colors onto the photonic crystal layer includes making a plurality of fluorescent layers, phosphorescent layers or quantum dot layers corresponding to pixels of different colors onto the photonic crystal layer. Since they are discussed above, the same parts thereof are omitted herein.

It should be noted that in the embodiment of the present application, in order to excite the light emitting medium layer 012 with high efficiency, the photoluminescence material of the light emitting medium layer 012 has an absorption spectrum, which has a relatively large overlapping region with the spectrum of the light emitted from the light emitting medium layer 012 under excitation. In order to guarantee an intensity of light emitted from the transflective layer 013, when the light is oscillated and interferes between the photonic crystal layer 011 and the transflective layer 013, the thickness D of the light emitting medium layer 012 shall satisfy the following equation:

$$D = \frac{\phi}{2n\pi},$$

if the zeroth period interference mode is used, wherein φ is a cumulative phase change of the light emitted from the light emitting medium layer 012 when it is reflected by respective reflection interfaces, that is, a sum of the phase changes of the light emitted from the light emitting medium layer 012 on the respective reflection interfaces, and n is a refraction index corresponding to a main peak wavelength of the light emitted from the light emitting medium layer 012. In one example, if the light emitting medium layer 012 emits red light, then n is a refraction index corresponding to the main peak wavelength of the red light. The reflection interface includes an interface between the photonic crystal layer 011 and the light emitting medium layer 012, and an interface between the transflective layer 013 and the light emitting medium layer 012. If the refraction index and the coefficient of light extinction of the light emitting medium layer 012 and the transflective layer 013 are respectively (n, k) and ($n_1$, $k_1$), then $$\phi = \tan^{-1}\left(\frac{2nk}{n^2 - n_1^2 - k^2}\right).$$

It should be noted that the step for making the light emitting medium layer 012 can includes forming the light emitting medium layer 012 by depositing a layer of fluorescent materials or phosphorescent materials with a thickness of D onto the photonic crystal layer 011 by the methods such as thermal evaporation, electron beam, MBE, magnetron sputtering, PECVD or the like.

Step 703, forming a transflective layer onto the light emitting medium layers.

Figure 10:
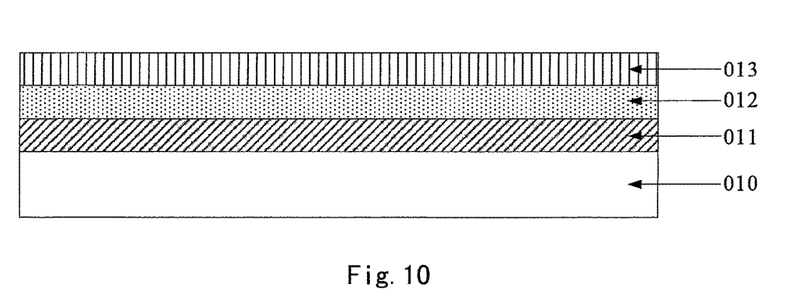
FIG. 10 is a schematic view for showing a structure after forming a transflective layer onto the light emitting medium layer as shown in FIG. 9.

FIG. 10 is a schematic view for showing a structure after forming the transflective layer 013 onto the light emitting medium layer 012. The transflective layer 013 is a half transparent and half reflection metal layer, which can be made from Ag or Al, so that the reflectivity of the transflective layer 013 is kept between 50%-70%. In the embodiment of the present application, the transflective layer 013 has a thickness in a range of 10~15 nm. For example, the step for making the transflective layer 013 can include depositing a layer of Ag with a thickness of 10~15 nm onto the light emitting medium layer 012 by a vacuum evaporation, so as to form the transflective layer 013.

Step 704, forming a capping layer onto the transflective layer.

Figure 11:
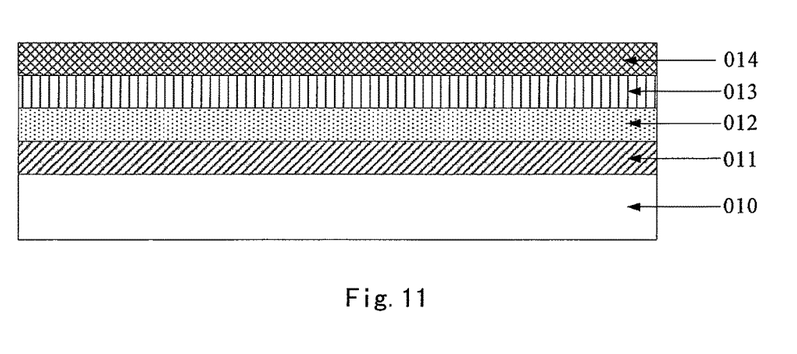
FIG. 11 is a schematic view for showing a structure after forming a capping layer onto the transflective layer as shown in FIG. 10.

FIG. 11 is a schematic view for showing a structure after forming the capping layer 014 onto the transflective layer 013. The capping layer 014 is typically made of the materials having high reflectivity and low coefficient of light extinction, for example NPB. Taking into consideration of the color difference from various angles, the capping layer 014 has a thickness less than 100 nm, and in one example, the thickness of the capping layer 014 is 80 nm. The step of forming the capping layer 014 can include depositing a NPB layer with a thickness of 80 nm onto the transflective layer 013 by vacuum thermal evaporation, so as to form the capping layer 014. The capping layer 014 can be used to prevent oxidation of metal in the transflective layer 013 and to improve light emitting property of the color filer substrate 01.

Also, it should be noted that the method for producing the color filter substrate in accordance with an embodiment of the present application can be applicable into production of display devices of types such as ADS, IPS, TN (Twist Nematic) or the like. The ADS technique is used to form a multidimensional electric field by parallel electric fields generated at edges of pixel electrodes and a longitudinal electric field generated between a pixel electrode layer and a common electrode layer within the same plane, so that all the aligned liquid crystal molecules between the pixel electrodes and right above the electrodes within a liquid crystal cell can be rotated and/or converted, thereby improving the working efficiency of the liquid crystal molecules of plane alignment system and increasing the transmission efficiency.

Figure 12:
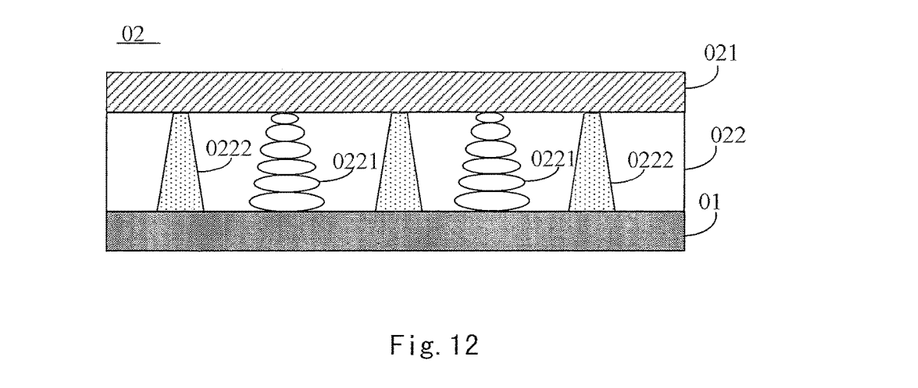
FIG. 12 is a schematic view for showing a structure of a display apparatus in accordance with an embodiment of the present application.

FIG. 12 is a schematic view for showing a structure of a display apparatus 02 in accordance with another embodiment of the present application. The display apparatus 02 includes an array substrate 021 and a color filter substrate 01 assembled together. The color filter substrate 01 can be a color filter substrate as shown in FIG. 1 or FIG. 2.

With reference to FIG. 12, the display apparatus 02 further includes a liquid crystal layer 022 charged between the array substrate 021 and the color filter substrate 01. The liquid crystal layer 022 includes a plurality of liquid crystal molecules 0221 and spacers 0222. The spacers 0222 respectively contact with and support the array substrate 021 and the color filter substrate 01, so that a space is formed between the array substrate 021 and the color filter substrate 01 and the liquid crystal molecules 0221 are located within the space.

Figure 13:
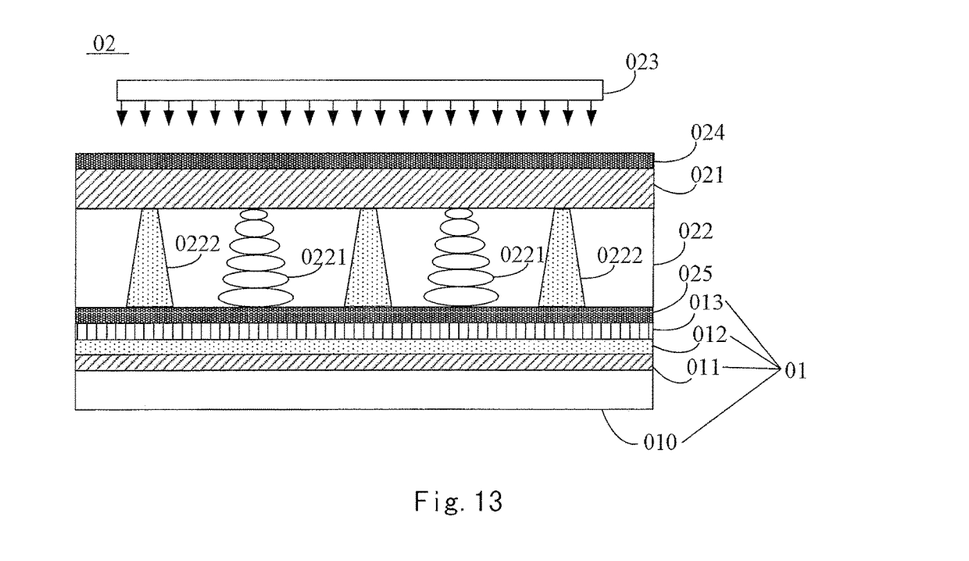
FIG. 13 is a schematic view for showing a structure of a display apparatus in accordance with another embodiment of the present application.

FIG. 13 is a schematic view for showing a structure of a display apparatus 02 in accordance with another embodiment of the present application. The display apparatus 02 includes an array substrate 021 and a color filter substrate 01 assembled together. The color filter substrate 01 can be the color filter substrate as shown in FIG. 1 or FIG. 2.

With reference to FIG. 13, the display apparatus 02 further includes a liquid crystal layer 022 charged between the array substrate 021 and the color filter substrate 01. The liquid crystal layer 022 includes a plurality of liquid crystal molecules 0221 and spacers 0222. The spacers 0222 respectively contact with and support the array substrate 021 and the color filter substrate 01, so that a space is formed between the array substrate 021 and the color filter substrate 01 and the liquid crystal molecules 0221 are located within the space. The liquid crystal molecules 0221 can be positive or negative. The array substrate 021 is provided with ITO (Indium Tin Oxides) electrodes (not shown in FIG. 13), and when a voltage is applied onto the ITO electrode, under the effect of the electric field, long or short axes of the liquid crystal molecules are regularly arranged along a direction of the electric field, exhibiting anisotropy and influencing the polarization direction of the incident light.

In one example, the color filter substrate 01 includes a base substrate 010, and a photonic crystal layer 011, a light emitting medium layer 012 and a transflective layer 013 formed on the base substrate 010 in sequence. The photonic crystal layer 011 is used to reflect the light emitted from the light emitting medium layer 012 to the transflective layer 013, so that the light emitted from the light emitting medium layer 012 is oscillated and interferes between the photonic crystal layer 011 and the transflective layer 013, and finally exits from the transflective layer 013.

The display apparatus 02 further includes a backlight source 023. The backlight source 023 is disposed at a backlight side of the array substrate 021. The light emitted from the backlight source 023 is violet light having a wavelength less than 430 nm, and the photonic crystal layer 11 reflects the light having a wavelength greater than 430 nm.

In one example, the photonic crystal layer 11 has transmissivity greater than 60% to the violet light having the wavelength less than 430 nm, and reflectivity greater than 80% to the light emitted from the light emitting medium layer 012. Specifically, the emitted light can be any one of red, green or blue light.

In one example, a polarizer 024 is provided at the backlight side of the array substrate 021, and an analyzer 025 is provided at one side of the color filter substrate 01 facing to the array substrate 021. A backlight source 023 is located at one side of the polarizer 024 facing away from the array substrate 021. The polarization direction of the polarizer 024 is perpendicular to the polarization direction of the analyzer 025.

With the embodiments of the present application, the structures of the devices have the following characteristics: structures of the existing LCD display device are used as a basic framework, and thus the implantation thereof is relatively high; in addition, the LED having light of short wavelengths is directly used as the backlight source, thereby reducing the power consumption of the backlight source end; and finally a particular color layer having one dimensional micro-cavity structure is introduced to replace the conventional CF layer. Therefore, according to the particular design thereof, the photonic crystal layer can highly transmit the light in a wave band in which the backlight is located, while having high reflectivity to other visible light wave band. The blue light emitted from the analyzer is transmitted into the color layer through the one dimensional photonic crystal layer, and excites the light emitting materials in the color layer by means of photoluminescence so as to emit three color lights of red, blue and green respectively, which are reflected and oscillated between the photonic crystal layer and the transflective layer, thereby forming interference, and finally exits from the transflective layer. By means of the modulation of the micro-cavity, the light finally emitted has small FWHM, and has a comparable saturation to that of the AMOLED.

The display apparatus in accordance with embodiments of the present application uses the violet LED as the backlight source, exciting the light emitting medium layer to display color. As compared to the conventional way in which the white light emitting LED is used to display color by the filter, the present display apparatus has become energy efficient.

In the prior art, the light from the backlight source is a white light which is formed by a blue light emitting chip in cooperation with yellow phosphor powders. There is energy loss during the process of forming the white light. The white light passes through the polarizer, the array substrate, the liquid crystal layer and the analyzer in sequence and finally exits from the color filter substrate. When passing through the polarizer, the array substrate, the liquid crystal layer, the analyzer and the color filter substrate, there is also energy loss, resulting in the emitted light having low energy. The display apparatus in accordance with embodiments of the present application, the violet light having the wavelength less than 430 nm is used as the backlight source. The violet light can be emitted from the violet light LED backlight source, without needing to generate the white light. It can avoid the energy loss when generating the white light. After the violet light emitted from the backlight source passes through the polarizer, the array substrate, the liquid crystal layer, the analyzer and reaches the color filter substrate, it directly excites the light emitting medium layer in the color filter substrate for displaying color. As compared to the conventional LCD display, the energy loss of the color filter layer is eliminated and thus the display becomes highly efficient.

The above described embodiments are a part of embodiments of the present application, rather than to limit the present application. Any modification, equivalents or improvements shall be considered within the scope of the present invention without departing apart from the spirit and principle of the present invention.

What is claimed is:

1. A color filter substrate, comprising:
    a base substrate;
    a photonic crystal layer located on the base substrate;
    a plurality of light emitting medium layers corresponding to pixels of different colors and located on the photonic crystal layer, wherein the light emitting medium layer is capable of emitting light with corresponding color under excitation of light from a backlight source;
    a transflective layer located on the light emitting medium layers;
    wherein the photonic crystal layer is used to reflect the light emitted from the light emitting medium layers to the transflective layer, so that the light is oscillated and interferes between the photonic crystal layer and the transflective layer and finally exits from the transflective layer.

2. The color filter substrate according to claim 1, wherein the photonic crystal layer satisfies the following condition: having transmissivity greater than 60% to the light from the backlight source and reflectivity greater than 80% to the light from the light emitting medium layers.

3. The color filter substrate according to claim 1, wherein the photonic crystal layer is one dimensional photonic crystal layer, the transflective layer is a half transparent and half reflection metal layer, and the light emitting medium layer is a photoluminescence layer.

4. The color filter substrate according to claim 1, further comprising a capping layer located on the transflective layer.

5. The color filter substrate according to claim 1, wherein the plurality of light emitting medium layers comprises red light emitting medium layers, green light emitting medium layers and blue light emitting medium layers corresponding to pixels of different colors, wherein each of the light emitting medium layers is composed of fluorescent layers, phosphorescent layers or quantum dot layers.

6. A display apparatus, comprising an array substrate and a color filter substrate assembled together, wherein the color filter substrate is a color filter substrate according to claim 1.

7. A method for producing the color filter substrate according to claim 1, comprising:
    forming the photonic crystal layer on the base substrate;
    forming the plurality of light emitting medium layers corresponding to the pixels of different colors onto the photonic crystal layer, so that each of the light emitting medium layers is capable of emitting light with corresponding color under excitation of light from a backlight source;
    forming the transflective layer onto the light emitting medium layers;
    reflecting by the photonic crystal layer the light emitted from the light emitting medium layers to the transflective layer, so that the light is oscillated and interferes between the photonic crystal layer and the transflective layer;
    exiting the reflected light from the transflective layer.

8. The color filter substrate according to claim 3, wherein the photonic crystal layer is formed by periodically stacking at least two kinds of transparent materials having different refraction indexes.

9. The display apparatus according to claim 6, wherein the display apparatus further comprises a backlight source located at a backlight side of the array substrate;
    the light emitted from the backlight source is violet light having a wavelength less than 430 nm, and the photonic crystal layer is capable of reflecting light having a wavelength greater than 430 nm.

10. The method according to claim 7, wherein the step of forming the transflective layer onto the light emitting medium layers comprises forming an Ag or Al layer with a thickness of 10-15 nm onto the light emitting medium layers by vacuum thermal evaporation, so that reflectivity of the Ag or Al layer is in a range of 60-70%.

11. The method according to claim 7, wherein the step of forming the plurality of light emitting medium layers corresponding to pixels of different colors onto the photonic crystal layer comprises:
    forming a plurality of fluorescent layers, phosphorescent layers or quantum dot layers corresponding to the pixels of different colors onto the photonic crystal layer.

12. The method according to claim 7, further comprising a step of forming a capping layer onto the transflective layer.

13. The color filter substrate according to claim 8, wherein the photonic crystal layer comprises a plurality of photonic crystal sub-structures corresponding to each of the light emitting medium layers;

wherein each photonic crystal sub-structure is formed by periodically stacking at least two kinds of transparent materials having different refraction indexes, and has at least five layers of transparent materials;

any two of the photonic crystal sub-structures have different ranges of optical forbidden bands and have an overlapping region, and reflectivity of each photonic crystal sub-structure to light is positively correlated to a number of the layers of transparent materials.

14. The display apparatus according to claim 6, wherein the photonic crystal layer satisfies the following condition: having transmissivity greater than 60% to the light from the backlight source and reflectivity greater than 80% to the light from the light emitting medium layers.

15. The display apparatus according to claim 6, wherein the photonic crystal layer is one dimensional photonic crystal layer, the transflective layer is a half transparent and half reflection metal layer, and the light emitting medium layer is a photoluminescence layer, wherein the photonic crystal layer is formed by periodically stacking at least two kinds of transparent materials having different refraction indexes.

16. The display apparatus according to claim 6, further comprising a capping layer located on the transflective layer.

17. The color filter substrate according to claim 13, wherein the transparent materials for the respective photonic crystal sub-structures are of identical kinds, and each photonic crystal sub-structure comprises at most ten layers of the transparent materials;

the transflective layer is an Ag or Al layer, a thickness of which is in a range of 10-15 nm.

18. The display apparatus according to claim 15, wherein the photonic crystal layer comprises a plurality of photonic crystal sub-structures corresponding to each of the light emitting medium layers;

wherein each photonic crystal sub-structure is formed by periodically stacking at least two kinds of transparent materials having different refraction indexes, and has at least five layers of transparent materials;

any two of the photonic crystal sub-structures have different ranges of optical forbidden bands and have an overlapping region, and reflectivity of each photonic crystal sub-structure to light is positively correlated to a number of the layers of transparent materials;

the transparent materials for the respective photonic crystal sub-structures are of identical kinds, and each photonic crystal sub-structure comprises at most ten layers of the transparent materials;

the transflective layer is an Ag or Al layer, a thickness of which is in a range of 10-15 nm.

\* \* \* \* \*